US012809312B2

(12) United States Patent
Paratte et al.

(10) Patent No.: US 12,809,312 B2
(45) Date of Patent: Nov. 24, 2026

(54) FREQUENCY SETTING OF A HOROLOGICAL OSCILLATOR BY OPTOMECHANICAL DEFORMATIONS

(71) Applicant: The Swatch Group Research and Development Ltd, Marin (CH)

(72) Inventors: Lionel Paratte, Marin-Epagnier (CH); Alexandros Mouskeftaras, Marseilles (FR); Ahmad Odeh, Renens (CH)

(73) Assignee: The Swatch Group Research and Development Ltd, Marin (CH)

( * ) Notice: Subject to any disclaimer, the term of this patent is extended or adjusted under 35 U.S.C. 154(b) by 0 days.

(21) Appl. No.: 19/312,100

(22) Filed: Aug. 27, 2025

(65) Prior Publication Data

US 2025/0390063 A1 Dec. 25, 2025

Related U.S. Application Data

(62) Division of application No. 18/056,990, filed on Nov. 18, 2022, now Pat. No. 12,572,115.

(30) Foreign Application Priority Data

Dec. 27, 2021 (EP) .................................... 21217879

(51) Int. Cl.
*G04B 15/14* (2006.01)
*G04B 17/06* (2006.01)

(52) U.S. Cl.
CPC ........... *G04B 15/14* (2013.01); *G04B 17/063* (2013.01)

(58) Field of Classification Search
None
See application file for complete search history.

(56) References Cited

U.S. PATENT DOCUMENTS

| | | | |
|---|---|---|---|
| 9,235,192 B2 | 1/2016 | Verardo | |
| 10,120,341 B2 | 11/2018 | Bossart | |

(Continued)

FOREIGN PATENT DOCUMENTS

| | | | |
|---|---|---|---|
| JP | 2017-26607 A | 2/2017 | |
| WO | WO-2016062889 A2 * | 4/2016 | ............ G04B 15/14 |

OTHER PUBLICATIONS

Translation of WO2016062889A2, Google (Year: 2016).*
(Continued)

*Primary Examiner* — Edwin A. Leon
*Assistant Examiner* — Matthew Daniel Hwang
(74) *Attorney, Agent, or Firm* — Oblon, McClelland, Maier & Neustadt, L.L.P.

(57) ABSTRACT

A method for the fine adjustment of the rate of a mechanical oscillator with an oscillating inertial mass, equipped, in a first step, with an actuator made of material suitable for irreversible local micro-expansion under the action of laser fires, to impart to an inertia-block a radial travel during suitable laser fires on a writing zone of the actuator, in a second step, the initial rate of the oscillator is set and measured, in a third step, the direction and the value of the deviation required to achieve a predetermined rate range, and of the travel to be imparted to inertia-blocks are calculated, in a fourth step, a writing zone is subjected to femtosecond laser fires to create expansion lines by local molecular expansion to radially deform the actuator, in a fifth step the rate is measured and the third step and fourth step are repeated if required.

7 Claims, 6 Drawing Sheets

(56) References Cited

U.S. PATENT DOCUMENTS

| | | | |
|---|---|---|---|
| 2013/0272100 | A1 | 10/2013 | Klinger et al. |
| 2017/0017205 | A1 | 1/2017 | Paratte |

OTHER PUBLICATIONS

Office Action issued in corresponding Japanese Patent Application No. 2022-199243 on Jun. 18, 2024 (with English Translation).

European Search Report issued in European Application 21217879.2 on Jun. 10, 2022 (with English Translation of Categories of Cited Documents).

Bellouard, "Non-contact Sub-nanometer Optical Repositioning Using Femtosecond Laser," Optical Express, vol. 23, No. 22, Nov. 2, 2015.

* cited by examiner

FREQUENCY SETTING OF A HOROLOGICAL OSCILLATOR BY OPTOMECHANICAL DEFORMATIONS

CROSS-REFERENCE TO RELATED APPLICATIONS

This application is a division of U.S. application Ser. No. 18/056,990 filed Nov. 18, 2022, which claims the benefit of priority from prior European Application No. 21217879.2 filed Dec. 27, 2021, the entire contents of each of which is incorporated herein by reference.

TECHNICAL FIELD OF THE INVENTION

The invention relates to a method for the fine adjustment of the rate of a mechanical horological oscillator including at least one inertial mass arranged to oscillate about an axis of rotation and returned to a rest position by elastic return means.

The invention further relates to a mechanical horological oscillator suitable for the implementation of this method.

The invention further relates to a timepiece, particularly a watch, including such a mechanical horological oscillator.

The invention relates to the field of rate setting of a mechanical horological oscillator, and in particular of an oscillator already fitted into a watch head.

TECHNOLOGICAL BACKGROUND

Modifying the frequency of a mechanical oscillator almost always involves a change of the rigidity of the elastic part, particularly a spring, or a change in the inertia/mass thereof. For example, in mechanical watch sprung balances, devices for adjusting the stiffness of the balance-spring are routinely found, such as the variation of the active length thereof by moving pins. A further method routinely used is inertia modification of the balance by moving small masses towards the outside or towards the inside of the balance, such as screws, or offset rotating inertia-blocks.

However, these operations require that the watch be opened and the movement removed, which tends to distort the result once the case is closed again, with a drift of up to 10 seconds per day, which is a nuisance for movements that need to be set from 0 to +2 seconds per day. Furthermore, these delicate mechanisms generally contribute to mechanical play causing drift, once the setting tool—the force used for setting—are removed.

SUMMARY OF THE INVENTION

The invention proposes to accurately adjust the frequency of a mechanical horological oscillator, for example a watch sprung balance, without having to dismantle the watch, or more generally the timepiece carrying this oscillator.

For this purpose, the invention relates to a method for the fine adjustment of the rate of a mechanical horological oscillator, according to claim 1.

The invention further relates to a mechanical horological oscillator suitable for the implementation of this method.

The invention further relates to a timepiece, particularly a watch, including such a mechanical horological oscillator.

BRIEF DESCRIPTION OF THE FIGURES

The aims, advantages and features of the invention will become more apparent upon reading the following detailed description, and with reference to the appended drawings, wherein:

FIG. 1 represents, with a dotted line, an incident laser beam encountering this balance;

DETAILED DESCRIPTION OF THE INVENTION

The invention proposes to induce permanent mechanical tension, and therefore a volume expansion, particularly by femtosecond laser excitation, in a flexible micromechanism machined in a glass (molten silica) or similar support.

The support is embedded on the inertial mass of the oscillator, particularly the balance, of a mechanical watch. The movement of a part of the mechanism will modify the inertia of this inertial mass, therefore the frequency of the oscillator, particularly of the sprung balance. Movements of the order of several micrometres can be obtained in such glass microstructures by writing parallel internal tension expansion lines, as seen in particular in the article "Non-contact sub-nanometre optical repositioning using femtosecond lasers", by Y. Bellouard, in "Optics Express, 2 Nov. 2015, volume 23, No. 22".

The microstructures per se are embodied thanks to a blanking method with a precision of +/−1 micrometre, and using the same type of laser, followed by chemical etching, as seen in the article cited above, or in the article "Fabrication of high-aspect ratio, micro-fluidic channels and tunnels using femtosecond laser pulses and chemical etching", by Y. Bellouard et al., in "Optics Express, 2004, 12, pages 2120-2129", or on the website of FEMTOprint SA, 6933 Muzzano (CH), on the page https://www.femtoprint.ch/devices-photos.

The absence of pivots or of any other frictional guidance ensures high positioning precision and zero hysteresis. The optical excitation is direct through a crystal or any non-absorbent casing separation for the wavelength of the laser, or out of focus at the passage point.

The invention is illustrated more specifically, and not restrictively, for the case where the oscillator is a watch oscillator, and is a sprung balance.

The invention relates to a method for the fine adjustment of the rate of a mechanical horological oscillator 100 including at least one inertial mass 1 arranged to oscillate about an axis of rotation D and returned to a rest position by elastic return means.

Figure 15:
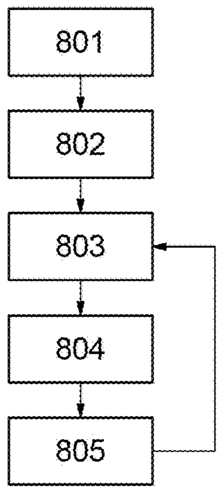
FIG. 15 is a block diagram including the five main steps of the rate adjustment method according to the invention.

According to the invention, and as seen in FIG. 15, in a first step 801, the oscillator 100 is equipped with at least one inertial mass 1 including an actuator 35 in a material suitable for irreversible local micro-expansion under the effect of laser fires. This actuator 35 is arranged to impart to an inertia-block 3 a radial linear travel with respect to the axis of rotation D, directly or by means of at least one travel amplifier 36, when a writing zone 39, or more specifically a first writing zone 391 on a first arm 33, or a second writing zone 392 on a second arm 34, included in the actuator 35 is subjected to suitable laser fires. It will be seen hereinafter that each writing zone 39, 391, 392, is capable of receiving expansion lines 390 by laser writing.

The description "writing zone 39" relates to the generic case, and the terms "first writing zone 391" and "second writing zone 392" relate to the preferred, but non-restrictive, application, on respectively a first arm 33, and a second arm 34 of the inertia-block 3.

More specifically, when an inertial mass 1, subjected to a rotation movement, extends on either side of the axis of rotation D, this inertial mass 1 is equipped with at least one pair of diametrically opposed actuators 35, in a material suitable for irreversible local micro-expansion under the action of laser fires. This is particularly the case when the inertial mass 1 is a balance of a sprung-balance type oscillator.

More specifically, when an inertial mass 1 is overhanging with respect to the axis of rotation D, like the inertial masses suspended by flexible strips, which are symmetrical with respect to a plane passing through the axis of rotation D, this inertial mass 1 is equipped with at least one pair of symmetrical actuators 35 with respect to this plane of symmetry.

More specifically, this method is applied to an oscillator 100 with at least two inertial masses 1 each including such an actuator 35.

In a second step 802, a first, particularly rough, setting of the initial rate of the oscillator 100 is performed in a first rate range and the rate is measured.

In a third step 803, the direction and the value of the rate deviation to be imparted to the oscillator 100 in order to bring it into a predetermined second rate range are calculated, and the direction and the value of the travel to be applied to each inertia-block 3 included in the oscillator 100 are calculated.

In a fourth step 804, at least one writing zone 39, 391, 392, is subjected to femtosecond laser fires to create at least one expansion line 390 by local molecular expansion of the material to deform the actuator 35 radially with respect to the axis of rotation D.

In a fifth step 805, the rate of the oscillator 100 is measured, and if required the third step 803 and the fourth step 804 are repeated until the rate of the oscillator 100 is within the predetermined second rate range.

More specifically, during the fourth step 804, a femtosecond laser source 700 is used, mounted on a table with crossing movements 710, or with radial travel, so as to increment different series of fires on different beams with respect to the axis of rotation D, to create a series of expansion lines 390 in the immediate vicinity of one another.

More specifically, during the fourth step 804, a femtosecond laser source 700 is used to perform fires in each direction of rotation of the inertial mass 1.

More specifically, during the fourth step 804, control means 790 are used to control the fires of the femtosecond laser source 700, according to the information in respect of the presence or absence of material provided by the combination of a detection laser 750 and a collection means 760 or a photodetector.

More specifically, during the second step 801, an actuator 35 is chosen including, on a first arm 33 a first writing zone 391, and on a second arm 34 parallel with the first arm 33 along a radial linear direction L and joining it at a common segment 334 a second writing zone 392. The actuator 35 is thus mounted in an “S” between, on one hand, a fastening zone 30 fastened to a support 2 mounted on the inertial mass 1 or directly fastened to the inertial mass 1, and, on the other, an exit point or a linking neck 32 for linking with an amplifying mechanism 36. The actuator 35 is arranged to act in two opposing directions along the linear direction L, whereby, during the fourth step 804, laser fire writing takes place in the first writing zone 391 on the first arm 33 for a gain setting, or in the second writing zone 392 on the second arm 34 for a loss setting.

More specifically, during the first step 801, an actuator 35 is chosen with an exit point or a linking neck 32 for linking with an amplifying mechanism 36 which is arranged to amplify the exit travel of the actuator 35, to impart an amplified travel to the inertia-block 3.

More specifically, this amplifier 36 is parallelogram type, and includes a connecting rod system with connecting rods 310 arranged between flexible necks 31 forming a linear guidance along a radial linear direction L.

More specifically, during the first step 801, an actuator 35 is chosen including a fastening zone 30 rigidly connected to a support 2 mounted on the inertial mass 1. And the support 2 forms a one-piece assembly forming a flexible micro-mechanism, with the actuator 35, and amplifier 36 and the inertia-block 3 mounted in series with each other.

More specifically, during the first step 801, an actuator 35 is chosen including a fastening zone 30 fastened to a support 2 mounted on the inertial mass 1 or rigidly connected to a support 2, and the actuator 35 and/or the support 2 is made of glass.

More specifically, during the first step 801, the inertial mass 1 is chosen in the form of a balance, which includes at least one pair of identical inertia-blocks 3 diametrically opposed with respect to the axis of rotation D.

More specifically, during the first step 801, the oscillator 100 is incorporated into a watch head 500 of a watch 1000, said watch head 500 including at least one transmissive transparent element 600, which separates the outside and inside of the watch 1000, and enables optical access for at least one laser to at least the inertial mass 1 of the oscillator 100 of the watch.

In a static alternative embodiment, during the first step 801, the oscillator 100 is equipped with stopping means or a stop-seconds means arranged to bear on an inertial mass 1, and the fourth step 804 is performed in a locked position of the inertial mass 1.

In a dynamic alternative embodiment, during the fourth step 804, femtosecond laser writing fires are performed during the oscillation of the inertial mass 1, wherein the angular position and fires are synchronised.

More specifically, during the fourth step 804, the fires are performed with a femtosecond laser, for example and non-restrictively of wavelength between 900 and 1100 nm, pulse time between 200 and 350 fs, pulse energy approximately between 200 and 300 nJ, repetition rate of 700 to 900 kHz. It is obvious that a different femtosecond laser (wavelength, pulse time and energy) can be used, provided that it can modify the material as described hereinabove.

The invention further relates to a mechanical horological oscillator 100 including at least one inertial mass 1 arranged to oscillate about an axis of rotation D and returned to a rest position by elastic return means, suitable for the implementation of this method. According to the invention, at least one inertial mass 1 includes an actuator 35 made of a material suitable for irreversible local micro-expansion under the action of laser fires. The actuator 35 is arranged to impart to an inertia-block 3 a radial linear travel with respect to the axis of rotation D, directly or by means of at least one travel amplifier 36, when a writing zone 39, 391, 392, included in the actuator 35 is subjected to suitable laser fires.

More specifically, the actuator 35 includes, on a first arm 33 a first writing zone 391, and on a second arm 34 parallel with the first arm 33 along a radial linear direction L and joining it at a common segment 334 a second writing zone 392, the actuator 35 thus being mounted in an “S” between, on one hand, a fastening 30 fastened to a support 2 mounted on the inertial mass 1 or directly fastened to the inertial mass 1, and, on the other, an exit point or a linking neck 32 for linking with an amplifying mechanism 36, the actuator 35 being arranged to act in two opposite directions along a linear direction L, whereby femtosecond laser fires are applied in the first writing zone 391 on the first arm 33 for a gain setting, or in the second writing zone 392 on the second arm 34 for a loss setting.

More specifically, the actuator 35 includes an exit point or a linking neck 32 for linking with an amplifying mechanism 36 arranged to amplify the exit travel of the actuator 35, to impart an amplified travel to the inertia-block 3. And the amplifier 36 is parallelogram type, and includes a connecting rod system with connecting rods 310 arranged between flexible necks 31 forming a linear guidance along a radial linear direction L.

More specifically, the actuator 35 includes a fastening zone 30 rigidly connected to a support 2 mounted on the inertial mass 1, and the support 2 forms a one-piece assembly forming a flexible micro-mechanism, with the actuator 35, and amplifier 36 and the inertia-block 3 mounted in series with each other.

More specifically, the actuator 35 includes a fastening zone 30 fastened to a support 2 mounted on the inertial mass 1 or rigidly connected to a support 2, and the actuator 35 and/or the support 2 is made of glass.

More specifically, the inertial mass 1 is a balance, which includes at least one pair of identical inertia-blocks 3 diametrically opposed with respect to the axis of rotation D.

The invention further relates to a timepiece, particularly a watch 1000, including at least one such mechanical horological oscillator 100. According to the invention, the watch 1000 includes a watch head 500 including at least one transmissive transparent element 600, which separates the outside and inside of the watch 1000, and enables optical access for at least one laser to at least the inertial mass 1 of the oscillator 100 of the watch.

The figures illustrate non-restrictive embodiments of the invention, in the specific case where the inertial mass 1 is a balance.

Figure 1:
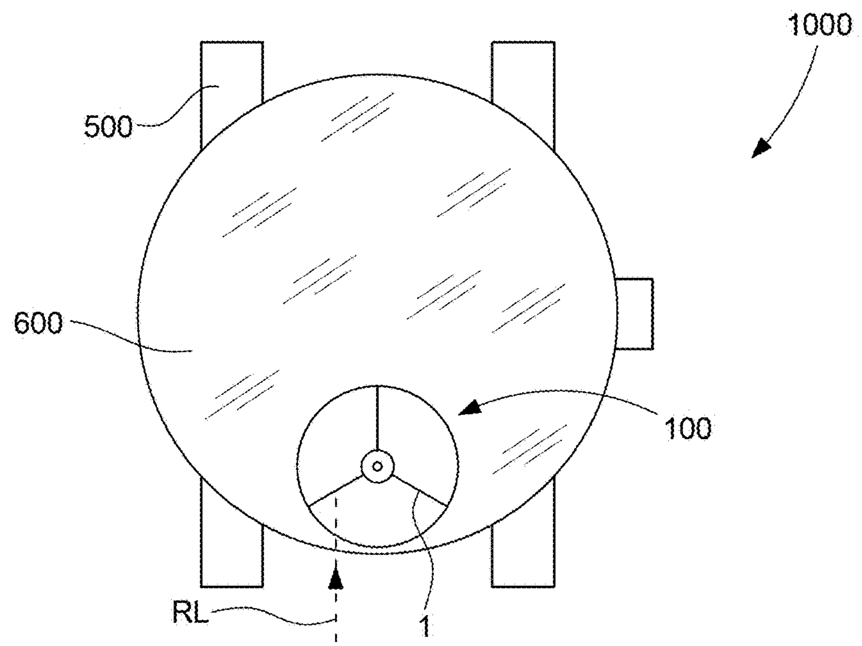
FIG. 1 represents, schematically and in a plan view, a watch, with a watch head including a transmissive transparent element which separates the outside of the watch and the inside of the watch. This transmissive transparent element, here represented in the form of a back, enables optical access for the user and an optical source to all or part of the watch oscillator, which is here a sprung balance, only the balance of which is represented, the balance-spring not being represented so as not to overload the figures.

FIG. 1 represents a timepiece 1000, particularly a watch, with a watch head 500, including a transmissive transparent element 600, such as a back, a crystal, or other, which separates the outside of the watch and the inside of the watch. This transmissive transparent element 600 enables optical access for the user and an optical source to all or part of the watch oscillator 100, and, in this instance, at least the balance 1, the balance-spring not being represented so as not to overload the figures. This FIG. 1 represents, with a dotted line, an incident laser beam RL encountering the balance 1.

The invention proposes to precisely adjust, through an at least locally transparent or low optical absorption casing such as this transmissive transparent element 600, the frequency of a sprung balance by means of a focused laser beam. The oscillator 100 is, either already set roughly to +/−15 seconds per day, for example using screws not shown, or specifically paired with a suitable balance-spring in this range. The action of the laser enables the fine setting to around 0-2 seconds per day, through the movement of small inertia-blocks towards the outside or towards the inside of the balance 1, thus modifying the inertia thereof, and therefore modifying the frequency of the oscillator, and thus enabling the precise adjustment of the rate of the watch.

Figure 2:
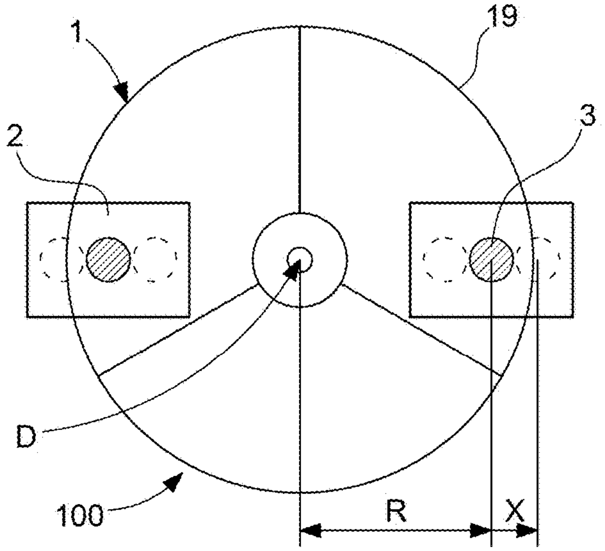
FIG. 2 represents, schematically and in a plan view as in FIG. 1, the detailed view of the balance according to the invention. This balance includes, from the felloe thereof to the transmissive transparent element, a plurality of supports disposed by symmetrical pairs with respect to the axis of rotation of the balance. These supports each support, on the transmissive transparent element side, at least one inertia-block which is radially mobile with respect to the axis of rotation of the balance. The figure shows, for each support, three different positions of such an inertia-block, an intermediate hatched middle one between two end positions marked with dotted lines.

FIG. 2 shows, in a plan view as in FIG. 1, the detailed view of the balance 1 according to the invention. This balance 1 includes, from the felloe 19 thereof to the transmissive transparent element 600, a plurality of supports 2 disposed by symmetrical pairs with respect to the axis of rotation D of the balance. These supports 2, particularly chips, each support, on the transmissive transparent element 600 side, at least one inertia-block 3 which is radially mobile with respect to the axis of rotation D of the balance 1. FIG. 2 shows, for each support 2, three different positions of such an inertia-block 3, an intermediate hatched middle one between two end positions marked with dotted lines, at a radial distance X from the intermediate position. This limited number of radial positions of the inertia-blocks 3 is merely one specific case to leave the figure legible.

The figures illustrate specific alternative embodiments where each support 2 is mounted on the balance 1, for convenience of execution; another alternative embodiment where the supports 2 and the balance 1 form a one-piece assembly is possible, although more costly to produce.

Figure 3:
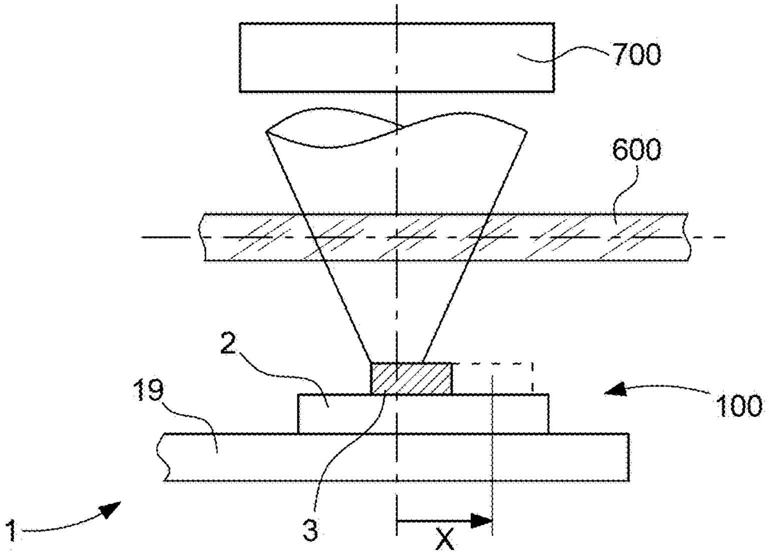
FIG. 3 represents the balance in FIG. 2, in a cross-section perpendicular to the transmissive transparent element, which separates, on one hand at the top of the figure the external environment wherein at least one laser source is positioned, and on the other at the bottom of the figure the inside of the watch case which contains the balance. The figure shows a felloe bearing a support supporting, on the transmissive transparent element side, such an inertia-block which is radially mobile with respect to the axis of rotation of the balance, under the effect of a beam emitted by the laser source. The figure is centred on an inertia-block represented with hatched lines, and shows another radial position of this inertia-block, represented with dotted lines.

FIG. 3 is a cross-section perpendicular to the transmissive transparent element 600, which separates, on one hand at the top of the figure the external environment wherein at least one laser source 700 is positioned, and on the other at the bottom of the figure the inside of the watch case which contains the balance 1. This balance 1 includes, from the felloe 19 thereof to the transmissive transparent element 600, a plurality of supports 2 disposed by symmetrical pairs with respect to the axis of rotation D of the balance. These supports 2 each support, on the transmissive transparent element 600 side, at least one inertia-block 3 which is radially mobile with respect to the axis of rotation D of the balance 1, under the action of a beam emitted by the laser source 700. FIG. 3 is centred on an inertia-block 3 represented with hatched lines, and shows another radial position of this inertia-block 3, represented with dotted lines. The inertia-blocks 3 are thus rigidly connected with a support 2, in turn fastened to the felloe 19 towards the outside of the balance 1 as illustrated.

The movement amplitude is dependent on several laser exposure parameters. This amplitude can be controlled very precisely, and the inertia-blocks 3 remain in place after an exposure, and it is possible to move the inertia-blocks 3 in both directions over a fixed number of cycles. So as not to disrupt the unbalance, it is necessary to group the supports 2 in diametrically opposed pairs, and it is necessary to set them simultaneously on the same amplitude. FIGS. 2 and 3 illustrate the simplest case with a single pair of supports 2. A further alternative embodiment consists of disposing an even number 2N of supports 2, N being an integer ranging from 1 to typically 10, and especially dependent on the diameter of the balance 1 and the possibility of geometrically fitting these pairs of supports 2. In this configuration with a plurality of supports 2, not only the frequency but also the unbalance can be set.

For the specific simple case of two diametrically opposed supports 2, illustrated by the figures, the relationship between the rate deviation (deviation with respect to the ideal frequency) of the oscillator 100, in seconds per day, and the radial movement X of two inertia-blocks 3, in metres, is given by the following equation:

$$\text{rate deviation } \Delta M = 86400^{*}x^{*}(2R+x)/\left(R^{2}+Io/2\text{m}\right),$$

where R is the value in metres of the neutral radius of gyration of the inertia-block 3, lo the basic inertia of the balance without inertia-blocks, in kg*m$^2$, and m the mass of an inertia-block in kg.

Figure 4:
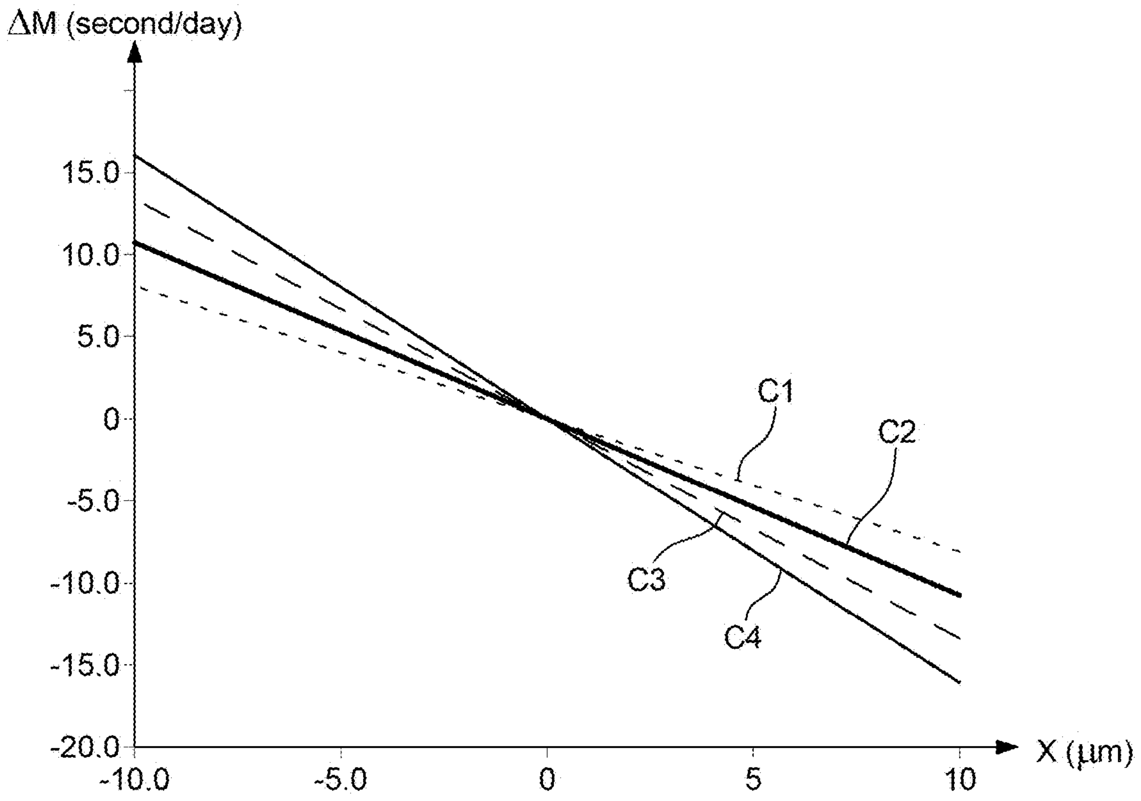
FIG. 4 is a graph showing on the y-axis the rate deviation in seconds per day, and on the x-axis the value of the symmetrical radial movement of two inertia-blocks, in micrometres, and superimposes the results obtained for four inertia-block mass values, from 1.20 mg to 2.40 mg.

FIG. 4 illustrates the numerical application of the preceding equation to a conventional mechanical watch balance, with the following characteristics:

external radius of balance = 5.3 mm;

gyration at $R = 4$ mm;

inertia of balance without inertia-blocks: $2^{e-9}\text{kg}^{*}\text{m}^{2;}$ mass of an inertia-block: $1.2 \leq \text{m} \leq 2.4$ mg;

targeted range +/− 15 seconds per day.

The graph in FIG. 4 shows on the y-axis the rate deviation ΔM in seconds per day, and on the x-axis the value of the symmetrical radial movement of two inertia-blocks, in micrometres, and superimposes the results obtained for four inertia-block mass values:

curve $C1$ for m = 1.20 mg;

curve $C2$ for m = 1.60 mg;

curve $C3$ pour m = 2.00 mg.

curve $C4$ pour m = 2.40 mg.

For example, curve C2, relating to inertia-blocks 3 with a mass of 1.6 mg, corresponds to the movement by +/−10 micrometres of a glass parallelepiped measuring 0.30×1.33×1.70 $mm^3$, on either side of the zero position thereof. The frequency adjustment obtained is here +/−11 seconds per day. This range can be easily extended, either by increasing the mass of the inertia-blocks, or by increasing the peak-peak travel. An alternative embodiment particularly consists of embedding, on this glass plate, an additional mass, made of metal or any other ad hoc material.

The choice of the opto-mechanical actuator is essential to obtain a reproducible and precise result. The publication mentioned above "Non-contact sub-nanometer optical repositioning using femtosecond lasers", by Y. Bellouard, in "Optics Express, 2 Nov. 2015, volume 23, No. 22" describes an ultra-high-precision positioning device, capable of serving to align optical fibre axes, which requires positioning within a few nanometres. It consists of a demonstrator made of a glass wafer, of a thickness of approximately 500 micrometres routinely used in packaging and in microfluidics applications.

Figure 5:
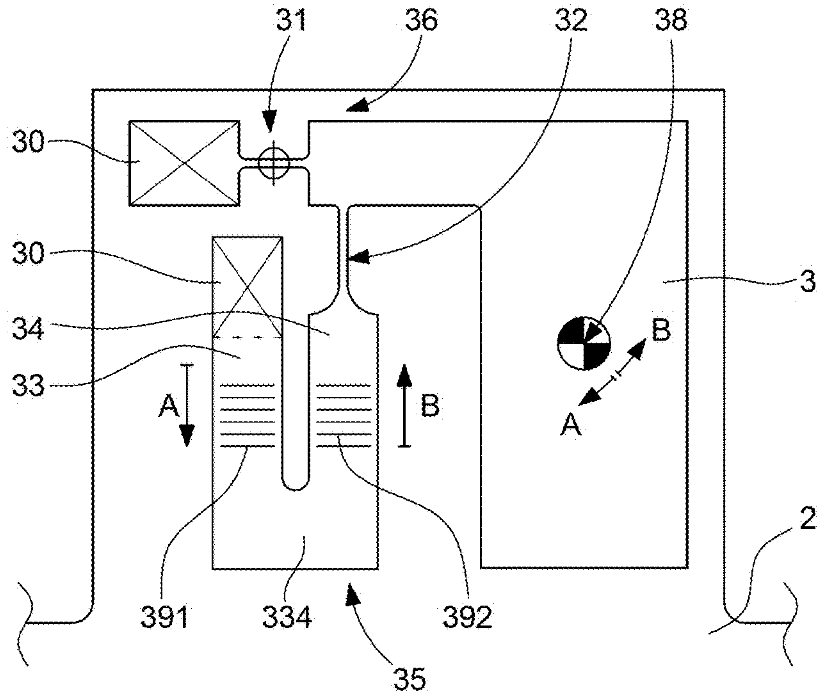
FIG. 5 represents, schematically, and in a plan view, the principle of the implementation of a optomechanical actuator for moving an inertia-block: the support bears fastenings, of which one bears the optomechanical actuator per se, which includes two parallel arms, forming a U as they are connected at the end by a common segment, the first arm extending between a fastening to the support and the common segment, and the second arm extending between the common segment and an exit point, here formed by a neck of an amplifying mechanism intended to amplify the exit travel of the optomechanical actuator to provide a sufficient travel for the inertia-block.

FIG. 5 describes, schematically, the principle: the support 2 bears fastenings 30, of which one bears the optomechanical actuator 35 per se, which includes two parallel arms 33 and 34, forming a U as they are joined at the end by a common segment 334, the first arm 33 extending between a fastening 30 and the common segment, and the second arm 34 extending between the common segment 334 and an exit point, here non-restrictively consisting of a linking neck 32 with an amplifying mechanism 36. The other fastening 30 bears the inertia-block 3, connected by the neck 31, acting as the centre of rotation.

FIGS. 2, 3, and 5 illustrate specific alternative embodiments where each inertia-block 3 is mounted on a support 2 at the fastenings thereof 30, for convenience of execution.

A further alternative embodiment, seen in FIGS. 6 and 9 to 12, where the inertia-block 3 and the corresponding support 2 form a one-piece assembly, particularly a chip, which makes it possible to embody the inertia-block 3 and the support 2 on the same level, the support 2 is then limited to a fastening zone 30 for the fastening on the balance 1.

Similarly, it can furthermore be envisaged that the inertia-blocks 3, the supports 2, and the balance 1, form a one-piece assembly, although this alternative embodiment is even more costly to produce.

Figure 6:
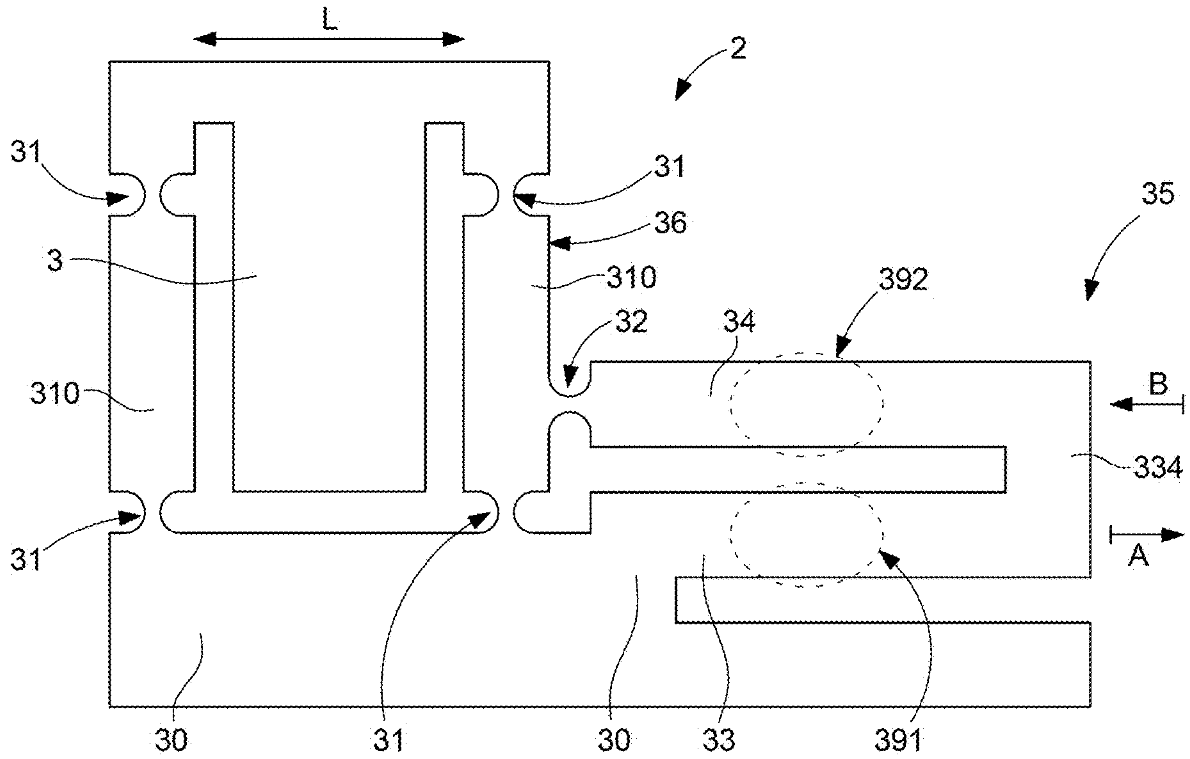
FIG. 6 represents, schematically, and in a plan view, a further alternative embodiment of the optomechanical actuator of FIG. 5, the exit travel whereof in a linear direction is amplified by a mechanical amplifier, here a parallelogram type mechanism with four necks, which makes it possible to convert the overall elongation, or overall retraction, measurable at the exit point of the second arm, into a travel of the inertia-block which is sufficient to notably influence the rate of the oscillator.

According to the invention, this first arm 33 and this second arm 34 are intended to receive laser pulses, and include writing zones respectively 391, 392, at which very brief bursts of laser pulses, emitted by the laser source 700, will create, in the thickness of the material, a local modification of the structure thereof by molecular expansion, this expansion being rapidly stopped by stopping the pulses, and the deformation hence remaining a permanent deformation. These core deformations are infinitesimal, and hence the method consists of locally juxtaposing a large quantity of zones expanded thus, to achieve a sufficient cumulative expansion to move the inertia-block 3 sufficiently along a linear direction L. Advantageously, a mechanical amplifier 36, for example a parallelogram type mechanism with four necks as seen in FIG. 6, makes it possible to convert the overall elongation, or the overall retraction, measurable at the exit point of the second arm 34, into a travel of the inertia-block 3 which is sufficient to notably influence the rate of the oscillator 100.

Figure 7:
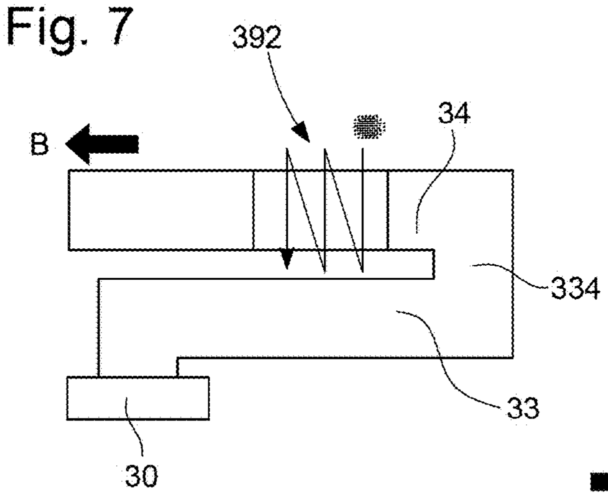
FIG. 7 illustrates schematically the case where the pulses etch the writing zone of the second arm, at the top of the figure, the overall movement of the exit point is then to the left of the figure, in a pushing movement of the inertia-block.
Figure 8:
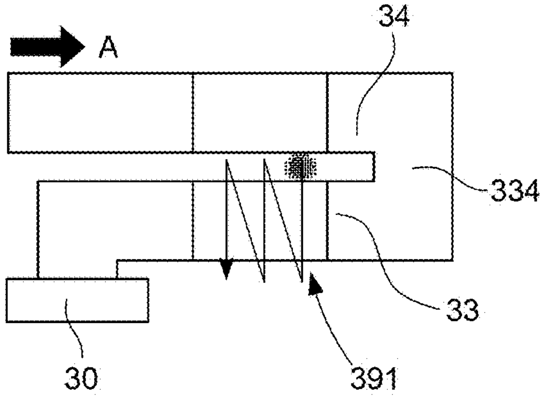
FIG. 8 illustrates schematically the opposite case to that of FIG. 7, where the pulses etch the writing zone of the first arm, at the bottom of the figure, the overall movement of the exit point is then to the right of the figure, in a retraction movement of the inertia-block.

It is understood that the movement is different, depending on whether the laser pulses etches the first arm 33 or the second arm 34: FIG. 7 illustrates the case where the pulses etch the second writing zone 392 of the second arm 34, the overall movement of the exit point is then in the direction of the arrow B, in a pushing movement of the inertia-block 3. Whereas FIG. 8 illustrates the case where the pulses etch the first writing zone 391 of the first arm 33, the overall movement of the exit point is then in the direction of the arrow A, opposite the direction of the arrow B, in a retraction movement of the inertia-block 3. It is thus possible to move an inertia-block 3 radially in one direction or in another.

The action of the laser does not cause blanking, or even surface etching, the aim is a molecular reorganisation at the core of the material, in the thickness thereof. The concept of writing expansion lines is a paraphrase to describe the application of series of pulses according to a grid wherein the projection of the trajectories on the plane of the inertia-block is presented as a series of very close parallel expansion lines, or very pointed zig-zag expansion lines, or other; the aim is indeed that of expanding the core material, and of cumulating more close expansions along the same linear direction L.

By writing expansion lines in the volume of the material at writing zones 39, particularly first writing zone 391, second writing zone 392, this material expands following the action of these zones subject to compressive stress. This state results from isolated heating that is very intense, but brief enough so as not to liquefy the material. There is merely a very slight expansion of the volume, the material remaining solid. This isolated heating is performed with a burst of very brief pulses of a femtosecond laser, for example that which is described, but not restricted to, by the article mentioned above "Non-contact sub-nanometer optical repositioning using femtosecond lasers", by Y. Bellouard, in "Optics Express, 2 Nov. 2015, volume 23, No. 22" (Yb-fiber amplified laser, from Amplitude systèmes SA, wavelength=1030 nm, pulse time 270 fs, pulse energy approximately 250 nJ, repetition rate 800 kHz). The beam is focused through a lens at a spot of a few micrometres, at a working distance of the order of 6 mm. A three-dimensional scan with a precision of within a few micrometres of these pulses thus makes it possible to define one or more volume zones under stress. It is obvious that a different femtosecond laser (wavelength, pulse time, energy and repetition rate) can be used provided that it can modify the material as described hereinabove. The working distance of the focusing lens can be varied according to the laser beam shaping and focusing optics.

The non-restrictive mechanism of FIGS. 5 to 8 shown here due to the great simplicity thereof, includes an "S"-shaped actuator 35 along a radial linear direction L, arranged to act in two opposite directions along this same direction, whereby the writing occurs in the top zone of the second arm 34 (gain) or bottom zone of the first arm 33 (withdrawal). The amplifier 36 includes non-restrictively a connecting rod system with connecting rods 310 between flexible necks 31 forming a linear guidance along the linear direction L, and makes it possible to amplify the actuator by a multiplication factor Km, such that the embedded square table, i.e. the inertia-block 3, moves by an amplitude of a few micrometres.

According to the invention of the article mentioned above (Y. Bellouard, 2015), for blocks of 200 parallel planes written in a volume of overall length of approximately 1 mm along the linear direction L, the following are obtained, with the laser parameters above and according to the figures: a multiplication factor Km of 6, an amplified travel of the inertia-block 3 of approximately 5 micrometres, for 200 expansion lines written over a length of 1 mm; the proper movement at the actuator 35, along the linear direction L, therefore equals, per written line: 5/(200*6)=4.167 nm/line (or plane).

The same technique can be used for blanking the microstructure per se, according to the articles cited above. A first step consists of writing, according to the same method of core expansion under the action of a laser, volume zones to be removed in a glass plate (molten silica). In a second step, the plate is subjected to chemical etching, which selectively removes the parts under stress. The machining obtained is also precise to the micrometre, and makes it possible to produce glass microstructures.

Figure 9:
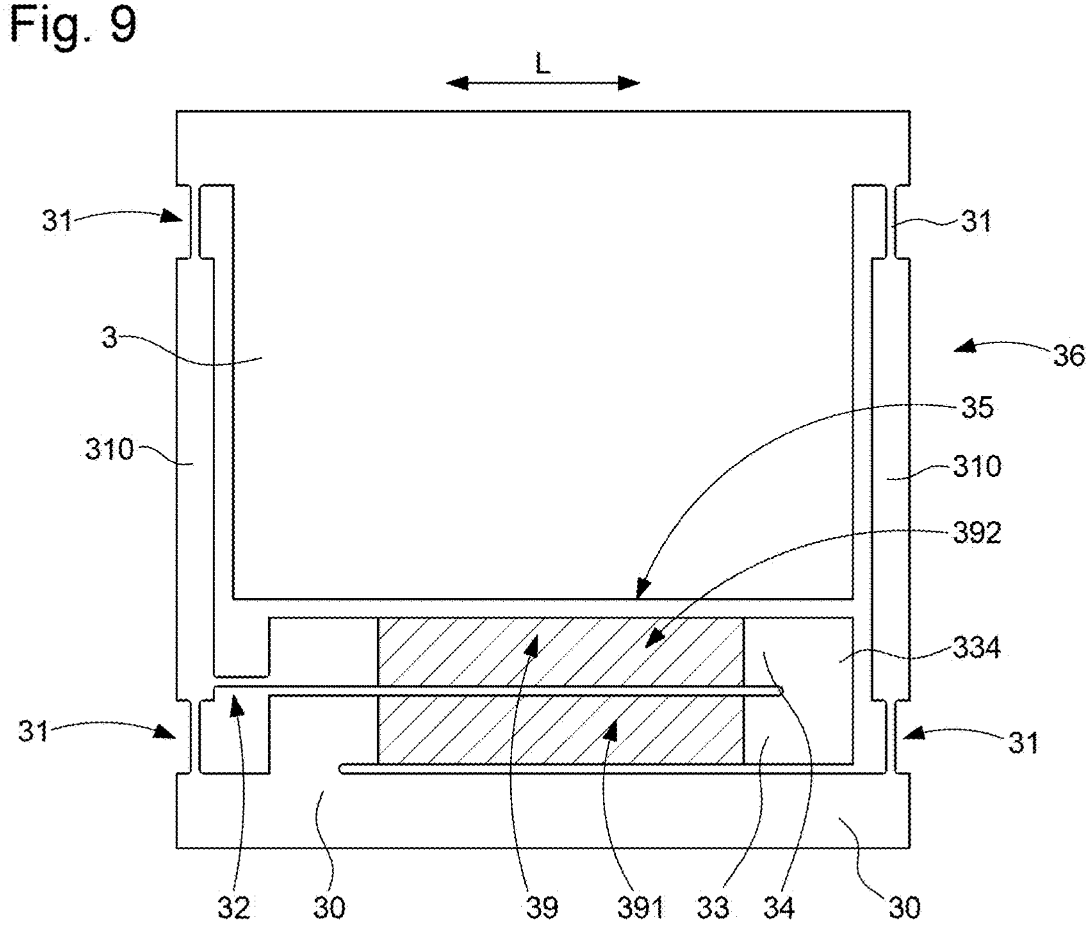
FIG. 9 represents, similarly to FIGS. 5 to 8, an alternative embodiment where an inertia-block and the corresponding support form a one-piece assembly formed by a chip, on a single level, the support is then limited to a fastening zone for the fastening on the balance; this alternative embodiment is in particularly suitable for the application of the invention to the specific case of a balance of a diameter of 10.6 mm, bearing 2×2 mm chips incorporating the support and inertia-block.
Figure 10:
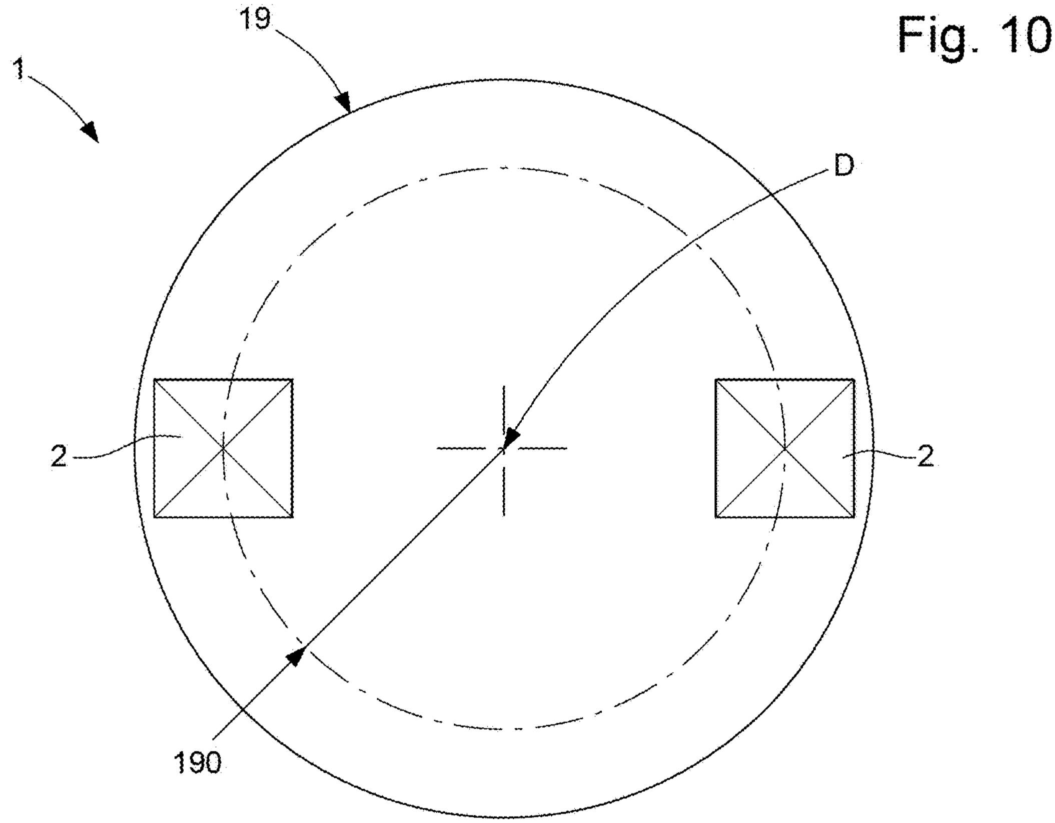
FIG. 10 represents, similarly to FIG. 3, a plan view of the balance equipped with two chips according to FIG. 9.

FIGS. 9 and 10 illustrate the application of the invention to the specific numerical example described above, with a balance of a diameter of 10.6 mm (outer diameters of the felloe 19); the diameter 190, here 8.0 mm, corresponds to the gyration diameter of the centres of mass of the inertia-blocks. The actuator 35 and the amplifier 36 are adapted to limit the planar dimensions of the supports 2 to a square with 2.0 mm sides, particularly a glass chip, of thickness 0.3 mm, which bears, on the same single level, the inertia-block 3 and the support 2 limited to at least one fastening zone 30, for fastening the balance 1 and for suspending the actuator 35, of the amplifier 36, and the inertia-block 3.

The mechanism schematically represented in FIGS. 5 to 8 is thus modified for reasons of compactness and adaptation to the typical dimensions of a sprung balance. We make the hypothesis that the same stress sigma, applied to an actuator beam of smaller cross-section, give rise to the same linear movement of 4.167 nm/line, by virtue of Hooke's law: dl/l=E*sigma, where dl=increase in length, l=length of the zone, E=Young's modulus of the material. To obtain the same amplitude as the preceding actuator, the writing length of the 200 expansion lines must therefore be identical and equal to 1 mm along the linear direction L.

As illustrated in FIG. 9, for a glass support 2 of thickness 0.3 mm, the mass of the rectangular pallet-stone forming the inertia-block 3 equals 1.6 mg, which corresponds to the rate-movement relation C2 of the graph in FIG. 4.

The distance between the middle of two deflection necks 31 delimiting a connecting rod 310 is, in this example, 1.40 mm, and the distance between the middle of the lower deflection neck 31 and the linking neck 32 is 0.14 mm. These deflection 31 or linking 32 necks have a width of 20 micrometres here, which is acceptable from a technological point of view. The multiplication factor Km between the travel of the actuator, and that of the mass equals, by virtue of the lever arm ratio: Km=1.400 mm/0.140 mm=10

The maximum linear amplitude of the structure equals: +/−x=Km*200 expansion lines*4.167 nm/line=2000*4.167 nm=+/−8.33 micrometres, which corresponds, via the graph C2, to approximately +/−Δrate=+/−9 seconds per day.

The resolution of the setting per written line and considering 200 expansion lines for each of the two ranges of 9 seconds per day therefore equals d_rate (1 line)=9/200=0.045 seconds per day and per line, which is ample to adjust a rate within a range of 0-2 seconds per day.

It is noted that two zones 1 mm in length along the linear direction L enable a single gain correction of +9 seconds per day and a loss correction of −9 seconds per day. In order to have several writing cycles, it is possible, either to increase the number of supports 2, or to increase the mass, which has the effect of having to write fewer expansion lines for the same movement, and therefore reserve space on the first arm 33 and on the second arm 34 for subsequent writings.

With respect to the implementation of the rate adjustment, an initial state is considered where, before correction, the rate of the watch is assumed to be known and measured, with the case closed. To perform the correction, a specific fitting is used to position the watch head precisely. A microscopic objective and a positioning stage with crossing movements xy then enables the centring of the laser source 700, particularly a femtosecond layer, on the balance 1.

From this stage, two options arise: either the balance is stopped by a locking/braking lever, such as a stop-seconds or similar means, or a mechanism for stopping and spatially holding the oscillator, and the laser fire is performed on an immobile target, or the balance 1 continues to oscillate, and the laser fire must then be synchronised with the angular position thereof.

The case in which the balance is stopped, and the laser fire performed on an immobile target, can be resolved with a semi-automatic positioning for example and non-restrictively with control means managing a camera with image recognition software which is centred on the axis of rotation D of the balance.

In the case in which the balance 1 oscillates, and in which the laser fire is synchronised with the angular position thereof, the method is more complex, but more advantageous as the setting is performed on the fly, without needing to stop the balance. The fire can be started with the start of the passage of the support 2 through a detection laser beam 750, as illustrated in FIGS. 11 and 12.

Figure 11:
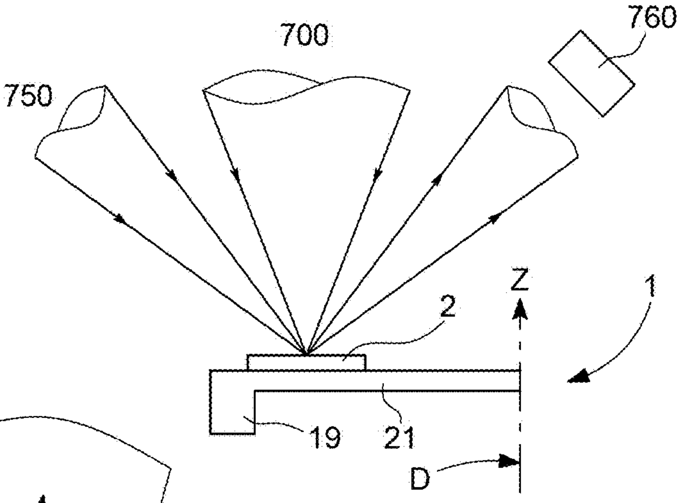
FIG. 11 is a schematic sectional view passing through the axis of rotation of the balance, and showing the felloe of this balance, bearing a support, the inertia-block not being represented, and the emitting writing laser source for writing on the writing zones, as well as, obliquely mounted in the left part of the figure, a detection laser, wherein the beam reflected by the balance and the elements included therein is collected at the right part of the figure by a collection means such as a photodetector.

FIG. 11 is a schematic sectional view passing through the axis of rotation D of the balance 1, and showing the felloe 19 of this balance, bearing a support 2, the inertia-block 3 not being represented, and the emitting writing laser source 700 for writing on the writing zones 39, 391, 392, as well as, obliquely mounted in the left part of the figure, such a detection laser 750, wherein the beam reflected by the balance 1 and the elements included therein is collected at the right part of the figure by a collection means 760 such as a photodetector.

Figure 12:
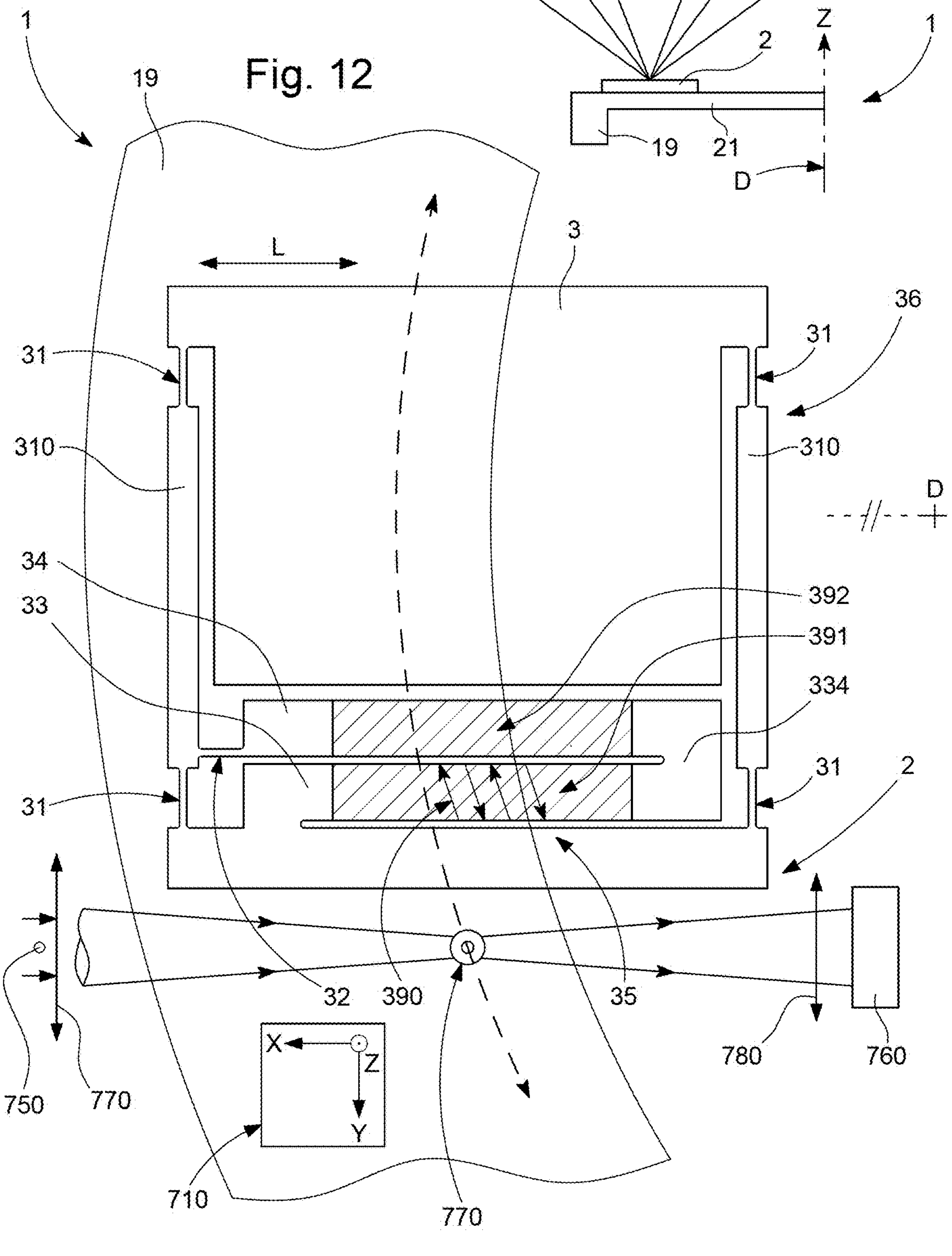
FIG. 12 represents, schematically and in a plan view, a detailed view of the arrangement according FIG. 11 with a laser writing source and a laser detection source, for the case where the balance oscillates, and where the laser fire is synchronised with the angular position thereof; the figure represents a part of the felloe of the balance, bearing a chip according to FIG. 9; the arc represented with a dotted line corresponds to the instantaneous position of the laser writing source, which fires perpendicularly to the plane of the figure, and which can thus write in the writing zone of the first lower arm in this instance, to create a molecular expansion symbolised by a small arrow in this writing zone, the neighbouring small arrows corresponding to writings also carried out in the same zone with different positionings along x of the writing source, corresponding to different beams with respect to the axis of rotation of the balance; at the bottom part of the figure, from left to right, a laser detection source, a converging lens, the incident beam to the balance, the reflection point on the balance or on the organs borne thereby, the reflected beam, a converging lens, and the photodetector can be seen.

FIG. 12 illustrates the detailed view of the arrangement according to FIG. 11 with a laser writing source 700 and a laser detection source 750, for the case in which the balance 1 oscillates, and in which the laser fire is synchronised with the angular position thereof; the felloe 19 of the balance 1 bears a chip according to FIG. 9; the arc represented as a dotted line corresponds to the instantaneous position of the laser writing source 700, which fires perpendicularly to the plane of the figure, and which can thus write in the writing zone 391 of the first lower arm 33 in this instance, to create an expansion line 390, i.e. a molecular expansion symbolised by a small arrow in this first writing zone 391, the neighbouring small arrows corresponding to other expansion lines 390, i.e. writings already produced in the same zone with different positionings along x of the writing source 700, corresponding to different beams with respect to the axis of rotation D of the balance 1. At the bottom part of the figure can be seen from left to right a laser detection source 750, a converging lens 770, the incident ray to the balance 1, the reflection point on the balance 1 or on the organs borne thereby, the reflected ray, a converging lens 780, and the photodetector 760.

In FIG. 12, the left edge of the felloe 19 of the balance 1 oscillates from top to bottom in the circular trajectory thereof. The chip 2 is fastened to the balance 1 by the base thereof. The optics are composed of a laser writing source 700 to perform the optical axis writing along the direction z perpendicular to the plane of the balance 1, and a detection laser 750, for example inclined by an angle of 45° with respect to the plane of the balance, wherein the axes of the incident and reflected beams are within the plane xz. The respective spots thereof can be slightly offset along x, but must remain on the same dimension along z.

Figure 13:
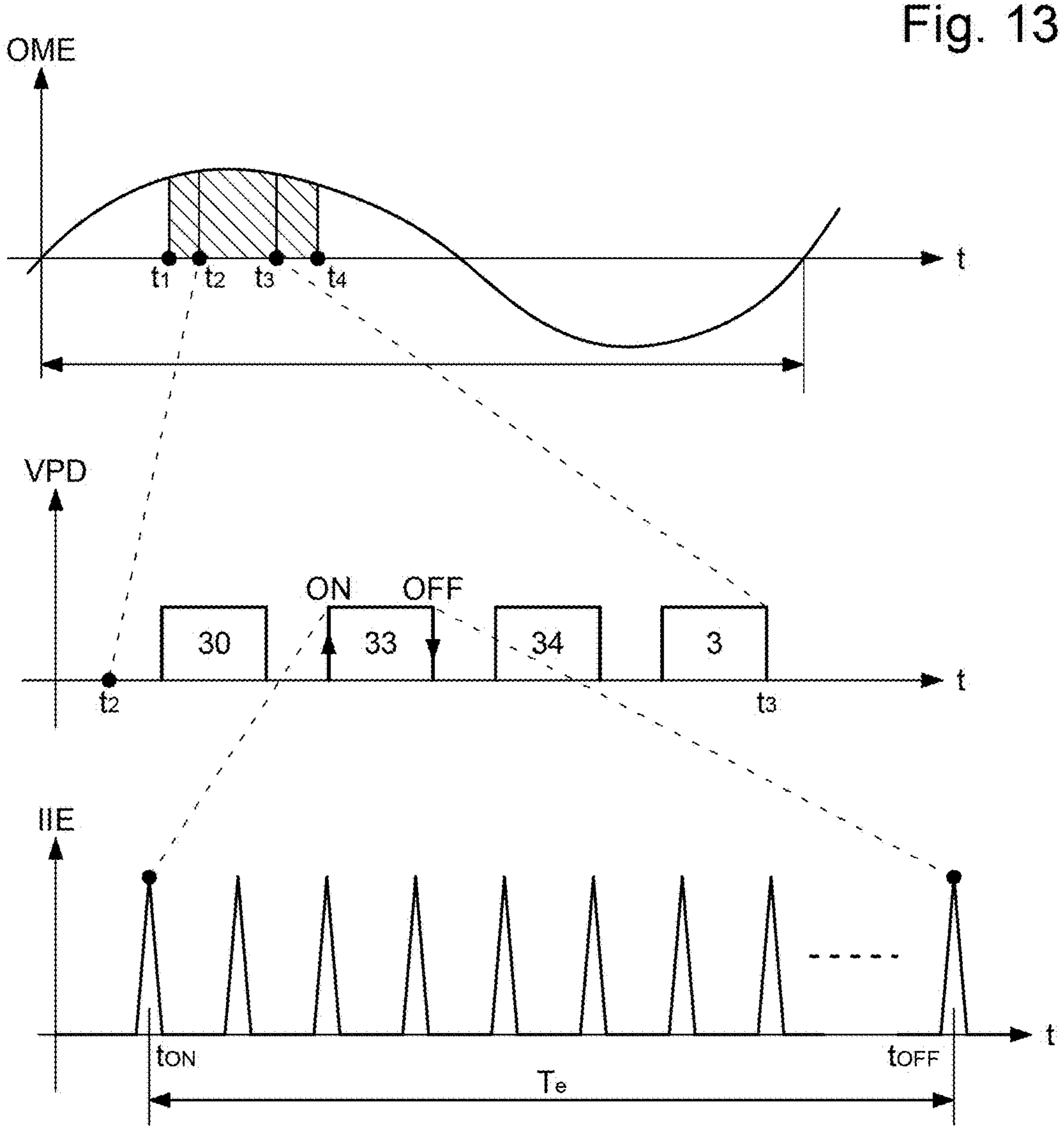
FIG. 13 juxtaposes three time graphs, plotted with different time scales on the x-axis, but which are arranged in relation to one another to show specific times and the phenomena taking place: the top graph shows the angular velocity omega OME of the balance on the y-axis, the middle graph shows the value of the photodetector signal VPD on the y-axis, and the bottom graph shows the optical intensity IIE emitted by the laser writing source on the y-axis.

FIG. 13 juxtaposes three time graphs, plotted with different time scales on the x-axis, but which are arranged in relation to one another to show specific times and the phenomena taking place: the top graph shows the angular velocity omega OME of the balance 1 on the y-axis, the middle graph shows the value of the signal VPD of the photodetector 760 on the y-axis, and the bottom graph shows the optical intensity IIE emitted by the laser writing source 700 on the y-axis.

When the balance 1 oscillates, the angular velocity OME thereof is maximum in the vicinity of the neutral point, either between the times t1 and t4 of the top graph in FIG. 13, which corresponds to a sprung balance oscillating at a few Hz. This zone is interesting, as the velocity does not vary much, therefore it can be considered as quasi-constant. The detection laser 750 is thus used to switch on and off a burst of writing pulses, from the laser writing source 700.

The signal VPD of the photodetector 760 associated with the detection laser 750 has the value 1 when the spot thereof is on a solid zone of the chip 2, i.e. successively fastening zone 30/first lower arm 33/second upper arm 34/inertia-block 3, as seen both in the middle graph of FIG. 13 and in a FIG. 12, and the signal VPD has the value 0 in a slot. Thus, this signal can be used to engage or release the writing of the burst by the laser writing source 700, either between the times t2 and t3, and more precisely in a first writing zone 391 for the gain setting on the first arm 33, or in a second writing zone 392 for the loss setting on the second arm 34. In the example illustrated by FIG. 12, four expansion lines 390 are written in the first gain zone on the first arm 33, which will draw the inertia-block 3 towards the axis of rotation D of the balance 1, and induce a rate gain by increasing the frequency. The start of the bursts of optical intensity IIE is triggered by the positive flank of the signal VPD at the time TON, and the stopping thereof is triggered by the negative flank of the signal VPD at the time TOFF. It is possible, for example, to use an alternation, i.e. a half-period, to write an expansion line 390, then be offset by an increment x with the laser writing source 700, to write the next adjacent expansion line to the next alternation, and so on. The detection of the direction of rotation is performed using the signal VPD, the pattern of which is different according to the direction. This makes it possible to always switch on the laser writing source 700 in the correct zone.

The (passage) writing duration Te in the first gain zone on the first arm 33, or in the second loss zone on the second arm 34, which is a zone of length Le, is given by:

$$Te = Le/(R^{*}A^{*}2\pi^{*}F), \text{ where } R = \text{radius of gyration, } A = \text{angular amplitude of the balance and } F = \text{frequency of the oscillator.}$$

In this example, Le=190 um, R=4 mm, A=270°, F=4 Hz, hence Te=0.40 ms.

The repetition frequency of the writing pulses being 800 kHz in this example, the number of pulses per passage therefore equals 800*0.40=320, and therefore the maximum (cumulative) gain error equals: 1/320*(+/−9 seconds per day)=+/−0.03 seconds per day, which is perfectly satisfactory for the application.

The femtosecond laser and chemical etching glass machining technique, which makes it possible to produce three-dimensional structures with a precision to the micrometre, is a tried-and-tested technique.

This technique makes it possible to produce 2 millimetric chips with flexible elements which can be moved over micrometric amplitudes, with nanometric precisions. The actuation of the nano-movement of the actuator part 35 is performed by laser internal stress writing. A system of flexible necks 31 and connecting rods 310 makes it possible to increase the amplitudes along the linear direction L.

The embodiment of such a chip 2 is adapted to the precise and reliable setting of the rate of a sprung balance, with a precision of 0.03 seconds per day, and a resolution of 0.09 seconds per day, in a range of typically +/−10 seconds per day. Obviously, the range amplitude and the resolution can be easily varied by adapting the design.

It can be noted that the invention offers the possibility of performing an infinitesimal and irreversible expansion, which, in theory, could enable, through a series of fires on the elastic return element of the oscillator, such as a spiral spring, flexible strip or similar, to modify the stiffness thereof; however, the creation of these deformed zones impedes the homogeneity of the component, and the risk is an impairment of the elastic properties of this elastic return element. For this reason, the invention is presented here preferably for an action on the inertial element, regardless of whether it is suspended by a spiral spring, or by elastic strips.

The setting system is compact and does not require additional complications in the watch 1000, other than mounting two or more glass chips 2 on the balance 1.

This setting can be performed directly on a complete watch 1000, provided that the watch head 500 includes a transmissive transparent element 600, such as a back, a crystal, or other, which is transparent or non-absorbent for the writing laser in optical access on the oscillator. The invention naturally relates to a watch 1000 thus equipped.

Figure 14:
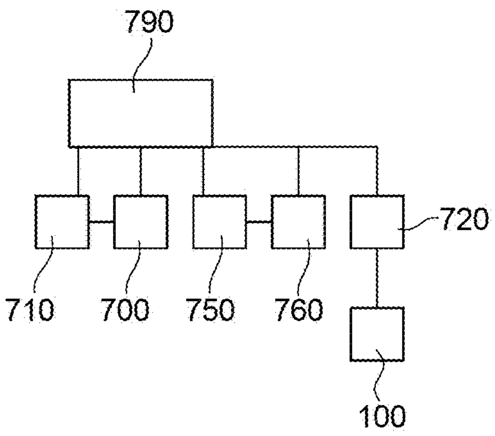
FIG. 14 is a block diagram showing the links between control means, a table with crossing movements for handling the writing laser, the latter, a detection laser, the means for collecting the reflected beam, and means for starting up and shutting down the oscillator.

FIG. 14 illustrates the peripherals and the links thereof: the control means 790, a table with crossing movements 710 for handling the writing laser 700, a detection laser 750, the means for collecting the reflected ray 760, and means 720 for starting up and shutting down the oscillator 100.

The external part of the setting (fitting, microscope, optics and lasers) typically occupies the volume of a desk, which enables quick and user-friendly setting, both in production and in-store for customer service.

The implementation of the invention is all the more superior given that the absorption of the ray is optimised by the physical protection separation (case, casing), given that a reliable system for positioning the laser spot is embodied. Naturally, adapted dimensioning should be adopted for live zones, above certain experimentally determined dimensions, to prevent increased fragility of these live zones, which could cause a premature rupture during shocks.

The invention claimed is:

1. A mechanical horological oscillator comprising:

at least one inertial mass arranged to oscillate about an axis of rotation and returned to a rest position by elastic return means, wherein at least one said inertial mass includes an actuator in a material suitable for irreversible local micro-expansion under an action of laser fires, said actuator being arranged to impart to an inertia-block a radial linear travel with respect to said axis of rotation, directly or with at least one travel amplifier, when a writing zone included in said actuator is subjected to femtosecond laser fires.

2. The mechanical oscillator according to claim 1, wherein said actuator comprises, on a first arm a first writing zone, and on a second arm parallel with the first arm along a radial linear direction and joining it at a common segment a second writing zone, said actuator thus being mounted in an "S" between a fastening zone fastened to a support mounted on said inertial mass or directly fastened to said inertial mass, and an exit point or a linking neck for linking with the travel amplifier, said actuator being arranged to act in two opposite directions along said linear direction, whereby said femtosecond laser fires are applied in said first writing zone on said first arm for a gain setting, or in said second writing zone on said second arm for a loss setting.

3. The mechanical oscillator according to claim 1, wherein said actuator comprises an exit point of a linking neck for linking with the travel amplifier arranged to amplify a travel of said actuator, to impart an amplified travel to said inertia-block, and wherein said amplifier deforms as a parallelogram, and includes a connecting rod system with connecting rods arranged between flexible necks forming a linear guidance along a radial linear direction.

4. The mechanical oscillator according to claim 1, wherein said actuator comprises a fastening zone rigidly connected to a support mounted on said inertial mass, and wherein said support forms a one-piece assembly forming a flexible micro-mechanism, with said actuator, the travel amplifier and said inertia-block mounted in series with each other.

5. The mechanical oscillator according to claim 1, wherein said actuator comprises a fastening zone fastened to a support mounted on said inertial mass or rigidly connected to a support mounted on said inertial mass, and wherein said actuator and/or said support is made of glass.

6. The mechanical oscillator according to claim 1, wherein said inertial mass is a balance, which comprises at least one pair of identical said inertia-blocks diametrically opposed with respect to said axis of rotation.

7. A watch comprising at least one of said mechanical oscillator according to claim 1, wherein said watch comprises a watch head including at least one transmissive transparent element, which separates the outside and inside of the watch and enables optical access for at least one laser to fire at said at least one inertial mass of said oscillator of the watch.

* * * * *